United States Patent [19]

Schumacher, II et al.

[11] Patent Number: 5,054,277

[45] Date of Patent: Oct. 8, 1991

[54] CUTTER BLADE FOR REAPING CUTTERS OF HARVESTING MACHINES

[76] Inventors: Gustav Schumacher, II, Gartenstrasse 8; Günter Schumacher, Raiffeisenstrasse 10, both of D-5231 Eichelhardt, Fed. Rep. of Germany

[21] Appl. No.: 494,813

[22] Filed: Mar. 15, 1990

Related U.S. Application Data

[63] Continuation of Ser. No. 166,463, Mar. 10, 1988, abandoned.

[51] Int. Cl.[5] .............................................. A01D 39/13
[52] U.S. Cl. .......................................... 56/299; 56/296
[58] Field of Search ................. 56/296, 298, 299, 300, 56/303, 301, 302

[56] References Cited

U.S. PATENT DOCUMENTS

| | | | |
|---|---|---|---|
| 76,135 | 3/1868 | Allen | 56/300 |
| 305,813 | 9/1884 | Hamblin | 56/301 |
| 540,623 | 6/1895 | Ball et al. | 56/301 |
| 839,850 | 1/1907 | Hummel | 86/302 |
| 964,252 | 7/1910 | Hebden | 56/300 |
| 1,214,345 | 1/1917 | Melby | 56/300 |
| 1,233,950 | 1/1917 | Aidlotte | 56/300 |
| 1,257,191 | 2/1918 | Crane | 56/303 |
| 1,384,933 | 7/1921 | Whitmoyer | 56/300 |
| 2,133,277 | 10/1938 | Bennett | 56/300 |
| 2,332,840 | 10/1943 | Boyer | 56/300 |
| 2,427,306 | 9/1947 | Schafer | 56/300 |
| 2,909,886 | 10/1959 | Stroburg et al. | 56/296 |
| 3,760,571 | 9/1973 | Foster | 56/298 |
| 4,223,514 | 9/1980 | Halls et al. | 56/299 |
| 4,380,887 | 4/1983 | Isbell | 56/296 |

FOREIGN PATENT DOCUMENTS

| | | | |
|---|---|---|---|
| 27676 | 9/1887 | Canada | 56/300 |
| 2451106 | 4/1976 | Fed. Rep. of Germany | 56/300 |

Primary Examiner—Paul J. Hirsch
Attorney, Agent, or Firm—W. Thad Adams, III

[57] ABSTRACT

The invention relates to a reaping-cutter blade for reaping cutters of harvesting machines, with an orifice (11) made, if appropriate, in the base edge, wherein two or more orifices (12) are provided in the blade leaf in front of the cutter bar (4). The orifices can at the same time appropriately have walls which, on one side of the blade, are at an angle of less than 90° relative to the plane of the blade leaf.

8 Claims, 1 Drawing Sheet

CUTTER BLADE FOR REAPING CUTTERS OF HARVESTING MACHINES

This application is a continuation application of U.S. Ser. No. 166,463 filed Mar. 10, 1988 now abandoned.

FIELD OF THE INVENTION

The invention relates to a cutter blade for reaping cutters of harvesting machines.

PRIOR ART

Blades of this type have been known for a long time, usually have a basic triangular shape and are riveted or screwed to a carrier rod, also called a cutter rail or cutter back, in varying numbers depending on the cutting width of the particular cutter bar.

The blades interact with reaping fingers functioning as counterknives. There are also known cutting systems in which the counterknives likewise comprise reaping-cutter blades which are either fastened rigidly to the cutter bar or which are used as a second reaping cutter working in the opposite direction to a first reaping cutter. The last-mentioned system is also known as a "double-cutter reaping bar".

When the blades of such a reaping cutter are no longer completely sharp, a cutting material which is difficult to cut properly or the undergrowth contained in the harvesting material is often drawn between the blade and the reaping fingers or the counterblades mounted or working on the second plane as counterknives. It collects there and lifts the reaping cutter off from the counterknives, with the result that the cutting capacity decreases rapidly and finally the reaping cutter is blocked.

Since it is not possible to prevent this difficult cutting material from penetrating between the blade and the counterknife, attempts have already been made to remove this material by making cleaning orifices in the blades. German Patent Specification 2,451,106 makes known a blade having an orifice which has a basic triangular shape, but which does not reach to the base edge of the blade.

A similar design is known from German Patent Specification 714,548 or German Utility Model 1,715,760, but this reaches to the base edge and is therefore open towards the base edge.

German Offenlegungsschrift 3,229,743 also describes various cleaning systems which, in addition to the embodiments discussed above, afford possibilities of providing cleaning orifices and cleaning edges as a result of an appropriate distance between two blades or a cutout on the blade flanks.

Finally, British Patent Specification 447,674 describes a blade having, in the flanks, slit-shaped recesses which likewise function as cleaning orifices.

Since, in order to clear away the cut material which settles mainly at the connection points, the cleaning orifice must extend up to and in front of the spacer wings, by means of which individual reaping fingers butt against one another, or up to and in front of the connecting web which, where double fingers are concerned, joins together two particular individual fingers designed as a counterknife, the blades according to the abovementioned publications, German Patent Specification 2,451,106, German Patent Specification 714,548 and British Patent Specification 447,674, are highly unstable. The horizontal loading capacity of the blades is very low and for the most part has to be absorbed by the blade fastening rivets or screws. As a result of the alternating stresses caused by the oscillating mode of operation, the blades very often come loose.

When the blades are fastened to the cutter bar at an appropriate distance from one another, thereby providing cleaning edges, the blade fastenings are likewise subjected to high load, because the blades are not supported relative to one another. Also, too steep a cutting angle is obtained because the blades have to be very much narrower, since the conventional spacing of three inches for the change point of the cutters moving to and fro has to be maintained.

A Soviet blade construction having two orifices is described in the periodical "Agrartechnik", page 479, of 11th Nov. 1955.

One orifice reaches to the base edge and is therefore open towards the base edge; and the other orifice is punched out of the blade gap as a triangle. A connecting web which stabilizes the blade in the horizontal direction therefore remains between the orifice in the base edge and the triangular orifice in the blade leaf.

However, this cutter blade is greatly weakened in the vertical direction as a result of the relatively large orifice. It also has the disadvantage that stones, thrown up by the tips of the reaping fingers during cutting with earth contact, as is necessary, for example, in the harvesting of soya beans, fall into these orifices, are then jammed against the reaping fingers and destroy both the blade and the reaping fingers. Furthermore, the cleaning effect of the triangular orifice is not very good, because cutting material which has penetrated into the orifice is pushed to and fro in this since one edge does not extend up to the mid-axis of the reaping finger.

In all the known embodiments in which appropriate orifices are provided in the blade leaf in front of the cutter bar, a further disadvantage is that the cutter pressure thumbs cannot be used efficiently or are subject to very high wear because of the relatively large orifices.

SUMMARY OF THE INVENTION

Starting from this known state of the art, the object of the present invention is to provide a blade which, as a result of an appropriate design of the orifices made in a cutter blade, on the one hand is reduced in terms of its mass moving to and fro and can therefore be used on all reaping systems with an oscillating mode of operation, at the same time also possessing virtually the same stability as a solid blade, having a comprehensive cleaning effect on all types of reaping fingers and other types of counterknives and being insensitive to loose stones thrown up.

According to the invention, this object is achieved by means of a cutter blade for reaping cutters of harvesting machines, with an orifice made or not made in the base edge, as appropriate, which is defined in that two or more orifices are provided in the blade leaf which reach up to the cutter bar or are arranged before the cutter bar.

Webs composed of blade material are obtained between these orifices, and these form additional cleaning edges and further stabilize the blade leaf.

Since the orifices are smaller than in the known blades, stones which, because of their size, are capable of causing damage to the blade and abutments cannot be jammed in them.

Furthermore, a blade, in which not only the orifices according to the invention in the blade leaf, but also the orifice already known for a long time in the base edge are provided, has proved especially advantageous.

The design of the orifice made in the blade leaf can take many different forms. In addition to a circular orifice or a square orifice, for example one or more of these orifices can be made drop-shaped, rectangular, oval or crescent-shaped.

These abovementioned embodiments of the orifices made in the blade leaf have proved particularly expedient.

It has also been shown that it is especially advantageous if the web located between two orifices in the blade leaf widens towards the base edge.

The orifices according to the invention in the blade leaf are appropriately obtained by being punched out. Accordingly, the side walls, provided in the blade leaf, of these orifices, are arranged conventionally perpendicularly to the top side or under side of the blade leaf.

However, it has proved extremely expedient if the walls of the orifices made in the blade leaf are at least partially at an angle of less than 90° relative to the plane of the blade leaf on one side of the blade. As a result of such an embodiment, on the one hand the cleaning edge is designed as a cutting edge, and on the other hand at the same time a larger opening, through which material severed by the cleaning edge can fall out, is obtained in the orifice.

It has proved especially expedient if the walls of the orifices made in the blade leaf are at least partially at an angle of 30° to 45° relative to the plane of the blade leaf on one side of the blade.

Since the cleaning effect of the cleaning edges produced as a result of the orifices according to the invention usually takes place in conjunction with the counterknives of the reaping fingers, it has proved particularly expedient if the walls of the orifices made in the blade leaf are at least partially at an angle of less than 90° relative to the plane of the blade leaf on the bevelled side of the blade. The result of this is that, on the one hand, the bevelled knife is provided on the same side as the blade, whilst on the other hand, on the same side, the walls of the orifices made in the blade leaf are likewise at an angle of less than 90°, and consequently the cleaning edges produced thereby assume the form of cutting edges which interact with the counterknives of the reaping fingers.

Although only a partial bevelling of the side wall is conventionally sufficient for this cutting and cleaning effect of the orifices made in the blade leaf, nevertheless it is preferable to bevel the side wall of these orifices all-round, because thereby the orifice can be widened and the severed material fall out more easily.

In the preferred embodiment discussed above, in which not only the orifices according to the invention in the blade leaf, but also an orifice in the base edge are provided, this orifice in the base edge appropriately has the shape and size of the blade tip. It is thereby possible, during production, to punch the blade tip of one blade out of the base edge of the adjacent blade. The consumption of material in the production of the blades can thus be reduced substantially.

BRIEF DESCRIPTION OF THE DRAWINGS

The invention is explained particularly in detail below with reference to the exemplary embodiments illustrated in the accompanying drawings.

In the drawings.

DESCRIPTION OF THE PREFERRED EMBODIMENTS

Figure 1:
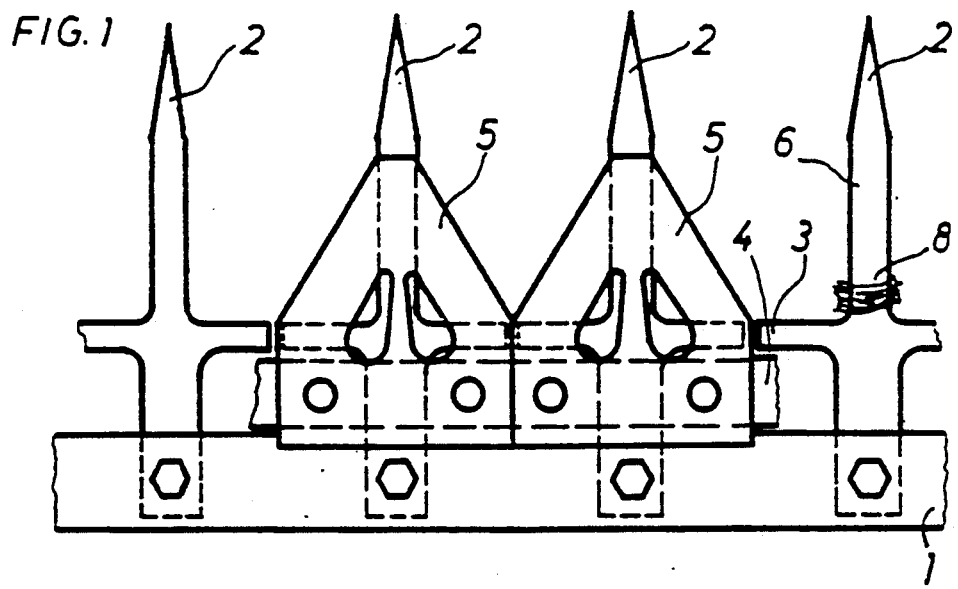
FIG. 1 shows a part view of a cutter bar with reaping fingers and with reaping-cutter blades according to the invention placed in the working position.

In FIG. 1, the reaping fingers 2 are screwed by means of their rear end to the finger bar 1. The reaping finger 2 can be designed singly or in one piece as double fingers or multiple fingers. To keep the reaping finger laterally stable, the individual reaping fingers butt against one another by means of spacer wings 3 and are thus supported relative to one another. Moreover, these wings serve as guides for the cutter bar 4, to which the individual reaping-cutter blades 5 are screwed or riveted. Where double or multiple fingers are concerned, between any two reaping fingers there is, instead of the spacer wings, a corresponding connecting web which likewise serves as a guide for the cutter bar 4.

The reaping-cutter blades 5 interact with the counterknives 6 of the reaping fingers. The counterknives 6 can be arranged either underneath or above the blades. There is also a known system in which both the lower finger and the upper finger are designed as a counterknife, the blades being fastened alternately to the cutter bar 4 on the one hand with the cutting edge upwards and on the other hand with the cutting edge downwards.

FIG. 1 shows the blades 5 at the change point occurring in most cutter-bar constructions. During the to-and-fro movement, the blade tip follows a path extending from one particular reaping-finger axis to the next. This path therefore corresponds to the distance between the reaping-finger tips, and since the blades butt against one another on the cutter bar it also corresponds to the blade width. Although there are also known systems in which the stroke is substantially larger than the blade width, systems of this type are nevertheless quite rare.

It often happens, during the cutting operation, that harvesting material difficult to cut properly is drawn over the counterknife and cannot flow off rearwards because of the spacer wings 3 or, on double or multiple fingers, the connecting webs arranged at the same point. This cut material then builds up at the point designated by the reference symbol 8 in FIG. 1 and blocks the reaping cutter only after a short time. It is therefore necessary to carry out time-consuming cleaning work which, if necessary, has to be repeated at very short intervals. Furthermore, the drive elements of the reaping cutters are subjected to very high load.

In the known embodiments, the most favorable self-cleaning effect was obtained by means of an orifice in the reaping-cutter blade which cleaned the critical region 8 of the reaping fingers. However, since this orifice has to be relatively large, the blade is greatly weakened thereby. Furthermore, when the blade is located between two particular reaping fingers, stones thrown up fall into this orifice and are jammed in it.

In contrast to this, in the embodiment according to the invention, the blade is substantially more stable as a result of the web 9. Moreover, this web 9 prevents correspondingly large stones from being jammed in the orifices, and a particularly decisive advantage is that additional cleaning edges 10 are obtained in these orifices.

As already mentioned, different shapes of the orifices can be selected, depending on the particular cutting material to which a shape proves to be especially favorable. Also, the shape of this orifice depends on the counterknife used.

Figure 3:
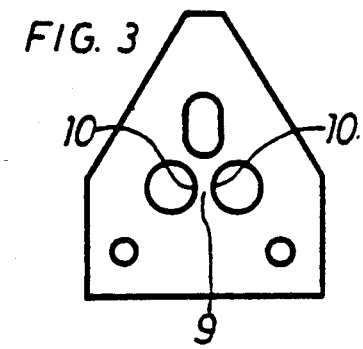
FIG. 3 shows a further reaping-cutter blade according to the invention with two circular orifices and a third orifice directed towards the blade tip.
Figure 4:
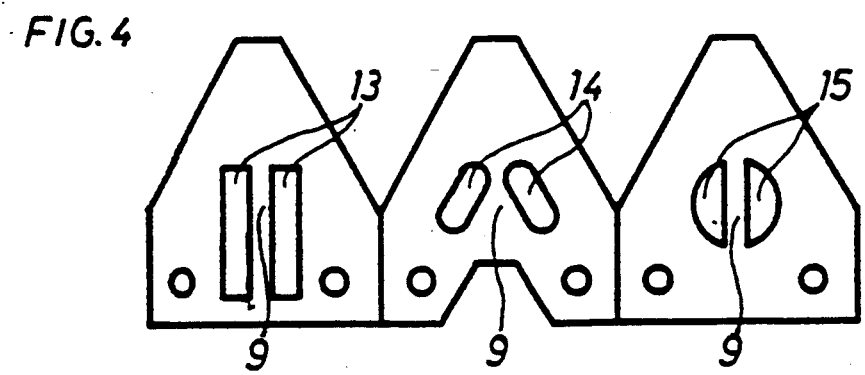
FIG. 4 shows three reaping-cutter blades according to the invention arranged next to one another and having orifices of different shapes.

FIGS. 3 and 4 illustrate preferred exemplary embodiments of the reaping-cutter blades according to the invention. Of course, differently shaped orifices can also be made in one and the same blade, and likewise different blades can be combined on one reaping cutter.

To provide a cleaning orifice already far forward near the blade tip, especially for harvesting material very difficult to cut, such as, for example, flax, an additional orifice extending into the blade tip can be made, as shown in FIG. 3.

Figure 2:
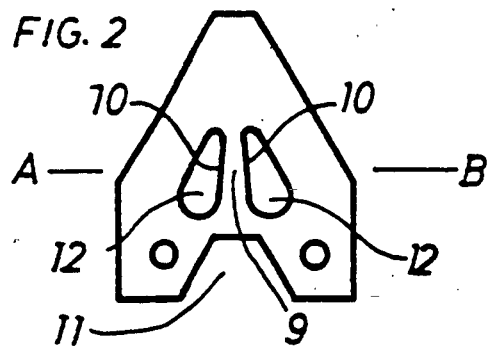
FIG. 2 shows an especially advantageous embodiment of a reaping-cutter blade according to the invention with two orifices and an additional orifice at the base edge.

A combination of two drop-shaped orifices 12 according to FIG. 2 has proved especially advantageous. In this embodiment, the part of the orifices which is largest in terms of area is in the region in which stability is impaired the least. Moreover, the web 9 widens towards the cutter bar, as a result of which stability is likewise increased and the cleaning edges 10 extend obliquely relative to the reaping-finger axis, thereby having a beneficial influence on the cleaning effect.

Figure 5:
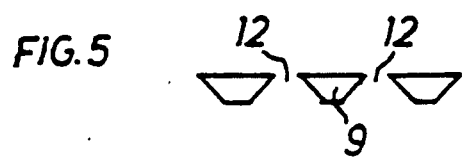
FIG. 5 shows a vertical section along the line A-B in FIG. 2, illustrating an especially advantageous design of the reaping-cutter blade according to the invention in respect of the wall of the orifice.

In the section shown in FIG. 5, taken along the line A-B according to FIG. 2, it can be seen that the walls of the orifices 12 made in the blade leaf are at an angle of less than 90° relative to the plane of the blade leaf on one side of the blade, specifically the top side of the blade. As a result of such an embodiment, the cleaning edges are shaped into cutting edges, and furthermore there is the additional effect that the orifices 12 widen downwards, so that the material severed by the cleaning edges can fall out downwards easily.

The bevelled side of the blade is likewise the top side of the reaping-cutter blade shown in section in FIG. 5.

We claim:

1. In a reaping cutter blade for reaping cutters of harvesting machines, wherein the blade includes a base edge and a blade leaf positioned in cutting relation with a cutter bar, the improvement which comprises a pair of elongated, rounded orifices formed in the blade leaf at an angle relative to the length of the cutter blade and extending to the cutter bar, each of said rounded orifices positioned whereby that portion of the blade leaf defining a web between the two orifices widens toward the base edge, and said base edge of said blade leaf includes an additional orifice.

2. A reaping cutter blade as claimed in claim 1, where the orifices are teardrop-shaped.

3. A reaping cutter blade as claimed in claim 1 where the orifices are oval-shaped.

4. A reaping cutter blade as claimed in claims 2 or 3, wherein said cutter blade includes two orifices and the web located between the orifices.

5. A reaping cutter blade as claimed in claim 1 wherein the walls of the blade leaf defining the orifices are at least partially at an angle of less than 90° degrees relative to the plane of the blade leaf on one side of the blade.

6. A reaping cutter blade as claimed in claim 1, wherein the walls of the blade leaf defining the orifices are at least partially at an angle of 30° to 45° degrees relative to the plane of the blade leaf on one side of the blade.

7. A reaping cutter blade as claimed in claim 1, wherein the walls of the blade leaf defining the orifices are at least partially at an angle of less than 90° degrees relative to the plane of the blade leaf on the beveled side of the blade.

8. A reaping-cutter blade as claimed in claim 1, wherein the walls of the blade leaf defining the orifices are at an angle of less than 90° degrees relative to the plane of the blade leaf on one side of the blade.

* * * * *